(12) United States Patent
Arthurs et al.

(10) Patent No.: US 7,097,911 B2
(45) Date of Patent: Aug. 29, 2006

(54) MULTI-LAYERED FLAME RETARDANT WRAP

(75) Inventors: Trevor Arthurs, Truro (CA); Joel Lee, South Weber, UT (US)

(73) Assignee: Central Products Company, Menasha, WI (US)

( * ) Notice: Subject to any disclaimer, the term of this patent is extended or adjusted under 35 U.S.C. 154(b) by 0 days.

(21) Appl. No.: 10/345,501

(22) Filed: Jan. 16, 2003

(65) Prior Publication Data

US 2003/0157358 A1    Aug. 21, 2003

Related U.S. Application Data

(60) Provisional application No. 60/349,157, filed on Jan. 16, 2002.

(51) Int. Cl.
B32B 23/10        (2006.01)
(52) U.S. Cl. ............... 428/511; 428/516; 442/412; 442/414; 156/298
(58) Field of Classification Search .......... 428/516, 428/509, 511; 162/136; 52/404, 406.1; 442/412, 414; 156/298
See application file for complete search history.

(56) References Cited

U.S. PATENT DOCUMENTS

| | | | | |
|---|---|---|---|---|
| 4,016,234 A | * | 4/1977 | Warren et al. ............. 264/129 |
| 4,726,985 A | * | 2/1988 | Fay et al. ................. 428/138 |
| 4,736,567 A | * | 4/1988 | Pienta .................... 53/135.3 |
| 4,882,892 A | * | 11/1989 | Pienta ....................... 53/176 |
| 5,104,701 A | * | 4/1992 | Cohen et al. ............. 428/34.5 |
| 5,160,788 A | * | 11/1992 | Feinberg ................... 428/344 |
| 5,723,020 A | * | 3/1998 | Robinson et al. ........... 162/159 |
| 5,890,591 A | * | 4/1999 | Pienta ....................... 206/410 |
| 5,891,553 A | * | 4/1999 | Hendrix et al. ............. 428/209 |
| 5,902,684 A | * | 5/1999 | Bullard et al. .............. 428/515 |
| 5,976,682 A | * | 11/1999 | Eichbauer ................... 428/213 |
| 6,153,544 A | * | 11/2000 | Radwanski et al. ......... 442/153 |
| 6,264,031 B1 | * | 7/2001 | Pienta et al. ............... 206/410 |
| 6,265,082 B1 | * | 7/2001 | Dunham et al. ............ 428/500 |
| 6,361,875 B1 | * | 3/2002 | Karaoglu et al. ........... 428/515 |
| 6,402,470 B1 | * | 6/2002 | Kvasnak et al. .......... 416/97 R |
| 6,420,470 B1 | | 7/2002 | Miksic et al. |
| 6,436,557 B1 | * | 8/2002 | Moriuchi et al. ........... 428/689 |
| 6,492,010 B1 | * | 12/2002 | Karaoglu et al. ........... 428/213 |
| 6,495,245 B1 | * | 12/2002 | Karaoglu et al. ........... 428/213 |
| 2001/0031329 A1 | * | 10/2001 | Shaffer .................... 428/36.9 |
| 2002/0179265 A1 | * | 12/2002 | Snyder ...................... 162/137 |
| 2002/0182964 A1 | * | 12/2002 | Snyder ...................... 442/394 |
| 2003/0049986 A1 | * | 3/2003 | Qureshi et al. ............. 442/221 |
| 2003/0157358 A1 | * | 8/2003 | Arthurs et al. ............. 428/551 |

OTHER PUBLICATIONS http://www.wconline.com/CDA/ArticleInformation/coverstory/BNPCoverStoryItem/0,3296,85808,00.html Oct. 2002.*
http://www.fortifiber.com/FBSG/other_solutions_products.htm (2003).*

* cited by examiner

*Primary Examiner*—D. Lawrence Tarazano
(74) *Attorney, Agent, or Firm*—Roberts, Mardula & Wertheim, LLC (57) ABSTRACT

A layered flame retardant system and method is disclosed comprising a first flame retardant stable layer for covering a solid combustible material and a second moisture protecting polyolefin stretch film layer. The polyolefin stretch film layer further compactly affixes the first flame retardant stable layer to the solid combustible material. Some embodiments incorporate a five layer flame retardant polyolefin stretch film with flame retardant additives primarily in the inner layers. Another embodiment incorporates thermal insulating material.

21 Claims, 8 Drawing Sheets

MULTI-LAYERED FLAME RETARDANT WRAP

CROSS REFERENCE TO RELATED APPLICATIONS

This application claims priority from pending U.S. provisional patent application Ser. No. 60/349,157, filed Jan. 16, 2002.

FIELD OF THE INVENTION

The present invention relates to flame retardant covering. More specifically, the present invention relates to multi-layered flame retardant system and method for using a multi-layered film and fabric to cover and wrap flammable solid materials and simultaneously provide moisture protection.

BACKGROUND OF THE INVENTION

A flame retardant wrap is used to protect flammable material. A flame retardant wrap may be used to cover a palate of flammable solid material, or just an individual item, for example a paper roll. A stretch film composite with a flame retardant component has been suggested for such use. The stretch film lends itself to easy coverage, the stretch film clings to the flammable material being covered and the stretch film provides a moisture barrier. However, it has been found that stretch films with flame retardant components fail to pass flame tests, for example large scale NFPA 701 testing (National Fire Protection Association).

When exposed to flame or heat, stretch film tends to melt and shrink away from the solid material intended to be protected. This causes the protected material to become uncovered by the shrink film and fully exposed to the flame. Once the flame retardant film loses its coverage dimension, the flame is no longer inhibited.

U.S. Pat. No. 6,264,031 to Pienta et. al. discloses a packaging method for combustible paper rolls comprising inner and outer stretch film layers with an intermediate Kraft paper layer. Although, mentioned as being fire resistant the Pienta invention does not pass NFPA 701 fire tests.

U.S. Pat. No. 6,265,082 to Dunham et. al. discloses a fire retardant composition that is a cured film that contains a curable resin and a fire retardant. The film is adhered to a flexible substrate in a manner to not substantially alter the hand of the flexible substrate. The fire retardant film is adhesively applied to some flexible substrate, typically a cloth fabric. Unless pre-applied at a processing site, adhesively attaching a fire retardant film requires manual intervention. A flame retardant material could be attached directly without the need of a surface film. Further the substrate is not flame retardant.

It is desirable to provide a method of completely covering a solid flammable material with a flame retardant and moisture resistant material that is snuggly attached to the flammable material without increasing the risk of spreading a fire and . It would be further desirable if the flame retardant system had a relatively low installation cost while passing large scale NFPA 701 flame test.

SUMMARY OF THE INVENTION

It is therefore an objective of the present invention to provide a moisture and flame retardant protection material for compactly affixing over a solid flammable material. It is a further objective of the present invention to provide moisture and flame protection in a low cost manner.

The present invention is a system and method for securing a flame retardant (FR) stable first layer over combustible solid objects with a second layer of stretch film that provides moisture protection as well as compactly affixing the first layer. The FR stable first layer is laid or tacked in place covering all of the combustible material. The stretch film is positioned and stretched over the FR stable first layer, securing the FR first layer in place. The FR stretch film compactly wraps the FR first layer to the flammable material.

Various materials may be used for the FR stable first layer. In certain preferred embodiments, flame retardant treated Kraft paper is utilized for the FR stable first layer. Embodiments of the invention also incorporate thermal insulation materials into the FR stable first layer.

The stretch film is preferably a polyolefin stretch film. The polyolefin stretch film may comprise flame retardant additives. When flame retardant additives are present, they are preferably concentrated within inner layers of a multi-layer polyolefin stretch film, for example, by being present in less than 1% by weight in the outer layers.

The present invention secures the FR first layer with a minimum cost and effort. Further, the present invention can be implemented where a flame retardant layer, such as inorganic fiber used as thermal insulation, has been previously installed. The wrapped stretch film often improves such thermal insulation properties and further acts as a barrier to air exchange.

DETAILED DESCRIPTION

Figure 1:
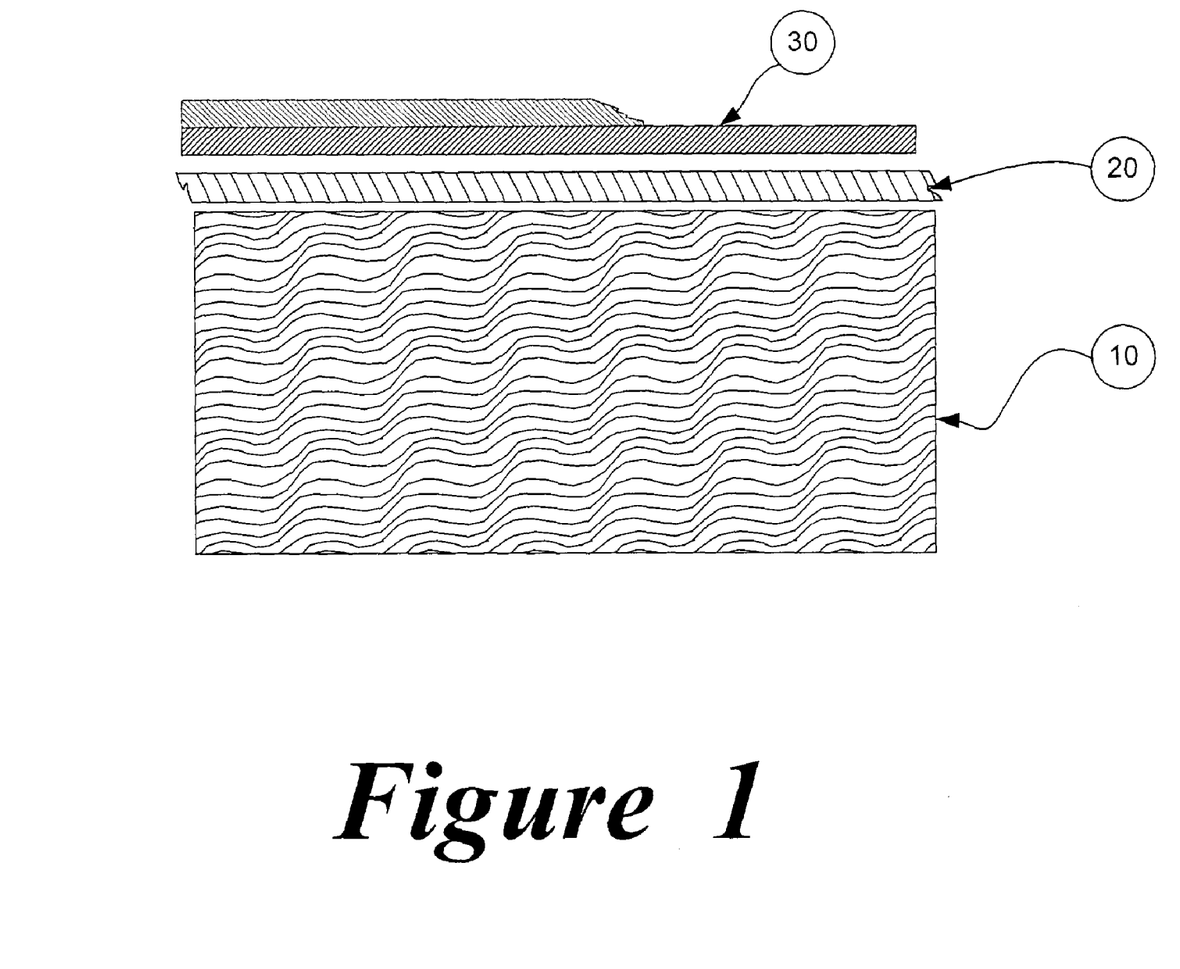
FIG. 1 is a schematic representation of a cross section of the flame retardant wrap of the present invention.

The present invention is directed to providing combined flame retardant and moisture barrier for protection of combustible solid articles. As illustrated in FIG. 1, a solid article 10 is first covered with a flame retardant (FR) stable first layer 20. In most instances, solid article 10 will be combustible as well as in need of protection from moisture. The FR stable first layer 10 is initially held in place by friction, adhesive or tacks. Other retention systems or methods may be used without deviating from the scope of the present invention.

FR first layer 20 is then compactly affixed with a polyolefin stretch film 30. Stretch film 30 may be applied using hand wrap apparatus, wrapping machine, or otherwise. Examples of stretch film wrapping machines are disclosed in U.S. Pat. Nos. 5,890,591, 4,736,567 and 4,882,892. By use of stretch film layer 30, the FR first layer is compactly affixed to solid article 10 in a cost effective fashion. As a result of the cost advantages, the present invention will also find use in protecting solid articles not subject to moisture damage.

Figure 2A:
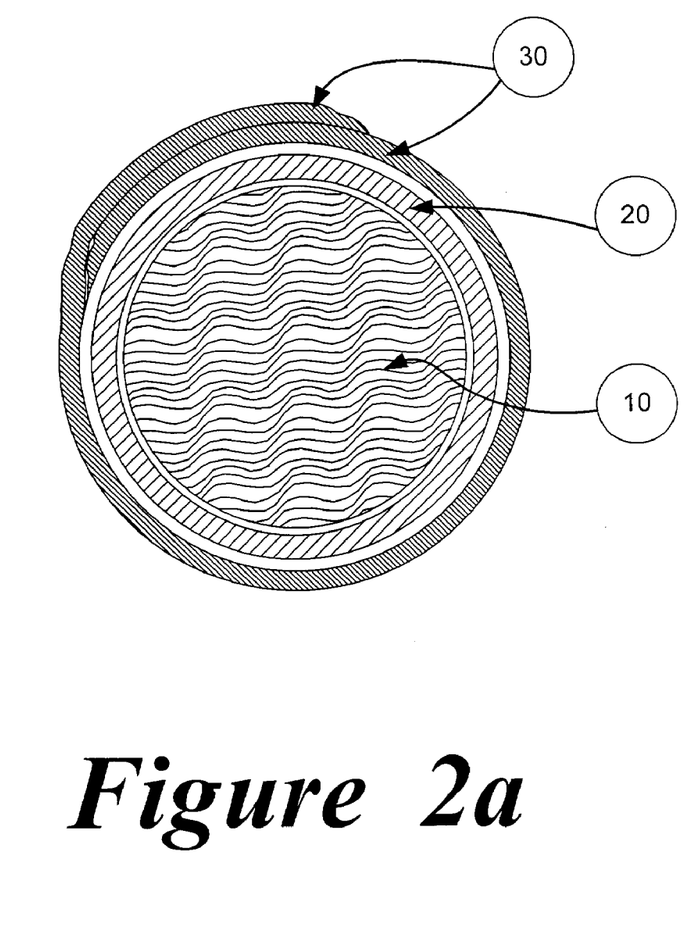
FIG. 2a is a schematic representation of a cross section of an embodiment of the flame retardant wrap of the present invention covering a cylindrical object.

The present invention is also used to fully enclose a combustible solid as illustrated in FIG. 2a. Solid object 10 is fully enclosed by FR stable first layer 20 that, in turn, is affixed with stretch film 30. It is typical in using the present invention that the stretch wrap is overlapped as illustrated. Typically stretch film 30 will have much reduced cling force toward FR stable first layer 20 as compared to cling to a layer of stretch film 30. As a result, an overlap of stretch film 30 is provided. The overlap forms a complete moisture seal as well as providing a stronger covering.

As used herein, "flame retardant stable first layer" and "FR stable first layer" comprise a covering material that resists the effects of heat during a large scale NFPA 701 flame test and remains dimensionally stable throughout the test. Although such materials may show signs of discoloration, they retain their protective flame retardant properties for the duration of the test. Examples of flame retardant first layers include flame retardant treated Kraft paper, mineral wool and fiberglass fabrics, asbestos fabrics, certain flame retardant treated natural fiber fabrics, fabrics of poly(m-phenylene)isophthalamide fibers (e.g. Nomex® brand fabric), fabrics of poly(p-phenylene)terephthalamide fibers (e.g. Kevlar® brand fabric), flame retardant treated fabrics of high density polyethylene fabrics (e.g. Tyvek® fabric), and the like.

Particularly preferred for providing low-cost FR stable first layer are the flame retardant treated Kraft papers. Typically a FR stable first layer of FR Kraft paper will have a basis weight of 16 to 150 pounds, with a basis weight of 20 to 80 pounds being preferred. FR Kraft paper is commercially available. For example, such paper is available from FiberMark Technical of Quakertown, Pa. and American Fine Paper Company of Appleton, Wis.

In general, flame retardant cellulose papers can be produced by treating cellulose paper with a flame retardant such as ammonium chloride borax, ammonium sulfamate, boric acid and sodium borate mixtures, antimony oxide, chlorinated paraffin, zinc-borate and others. Further examples and descriptions on treating cellulose papers with fire retardant compositions can be found in U.S. Pat. No. 6,153,544 to Radwanski et. al.

Figure 2B:
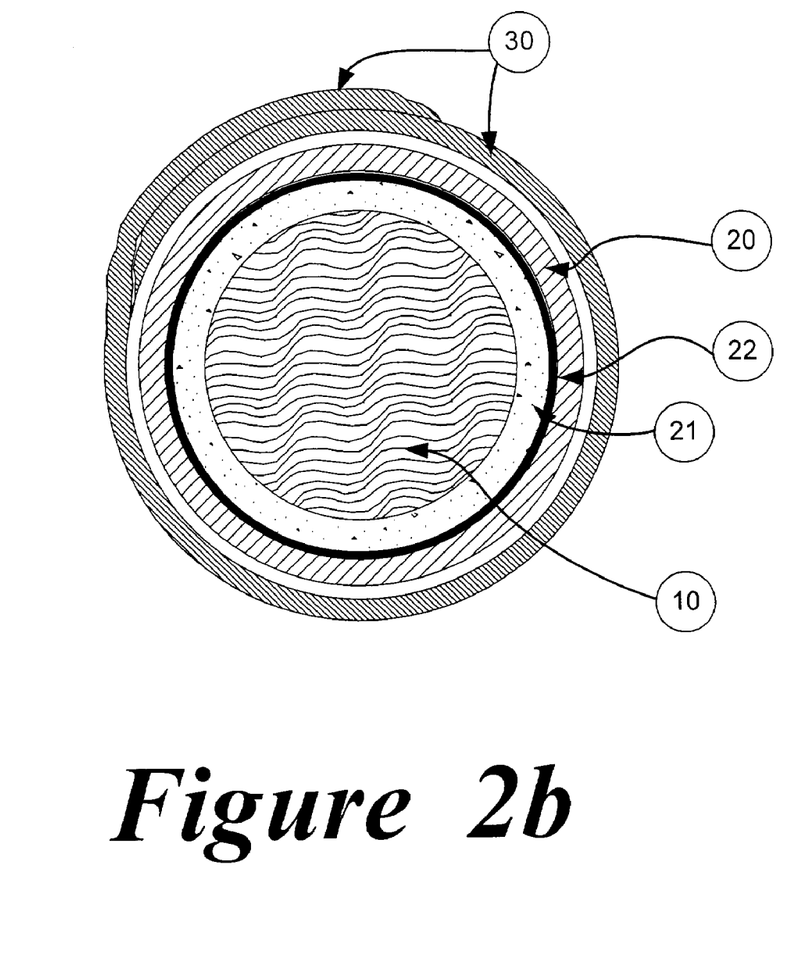
FIG. 2b is a schematic representation of a cross section of an embodiment of the flame retardant wrap of the present invention covering a cylindrical object comprising thermal insulation layer.

Another embodiment of the present invention is illustrated in FIG. 2b. In contrast to the embodiment of FIG. 2a, the FR stable first layer further comprises a thermal insulation material 21. The outer layer 20 of the FR stable first layer of FIG. 2b is equal in character to FR stable first layer 20 of FIG. 2a. Various insulation composites and compositions are suitable for insulation material 21, including fiber glass, mineral fiber, mineral wool, refractory ceramic fiber, elastomeric foam, phenolic foam, polyurethane foam, and the like. Of these, particularly preferred are the non-combustible insulation materials, for example, fiberglass, mineral fiber and refractory ceramic fiber. Insulation material 21 may also be affixed to outer layer 20 with an adhesive layer 22. The resultant FR stable first layer (i.e. layer 20 plus layer 21 and optional layer 22) of FIG. 2b provides insulating, flame retarding and dimensional stability characteristics.

Figure 3A:
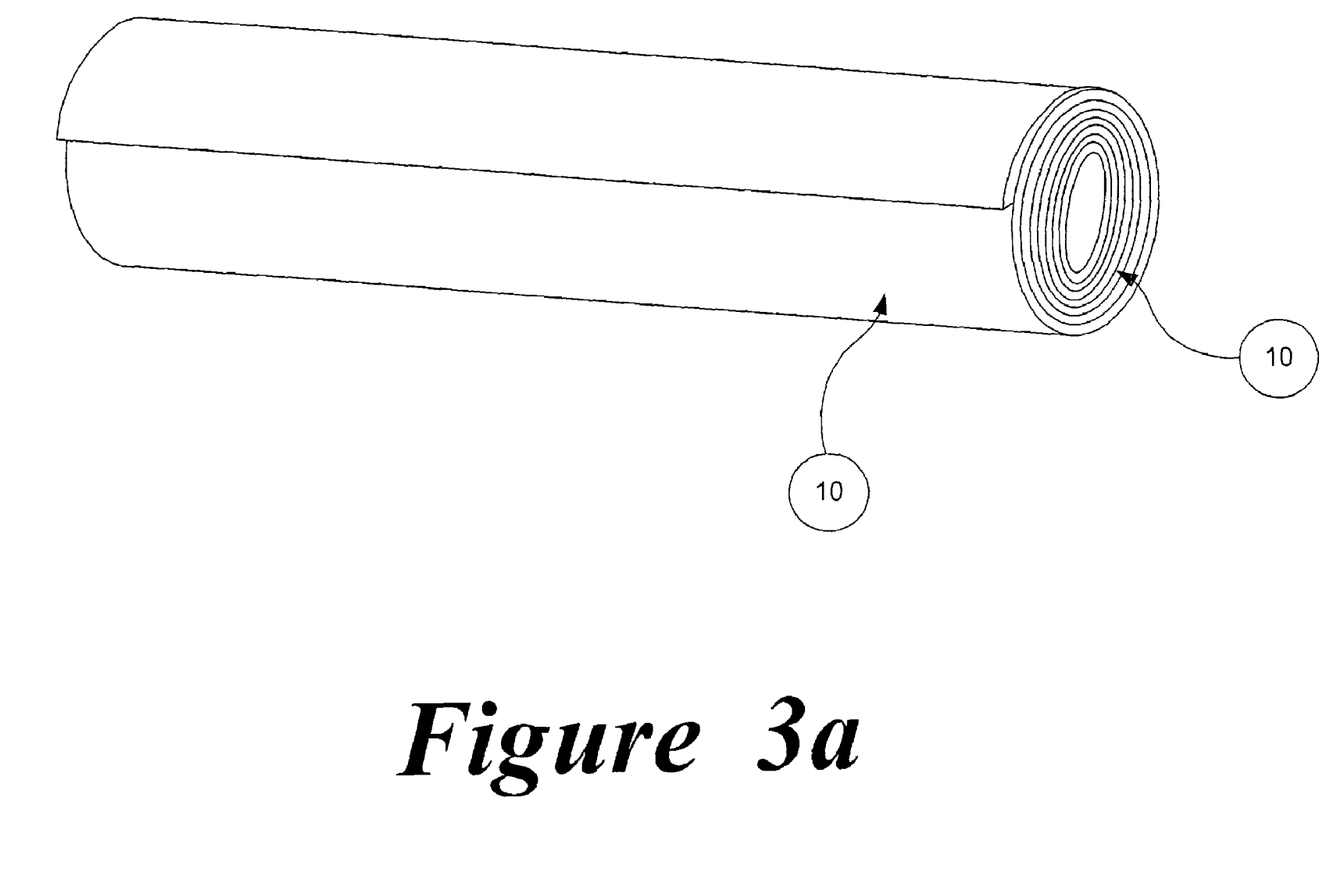
FIG. 3a is a schematic representation of a roll of combustible material, for example, a paper roll.
Figure 3B:
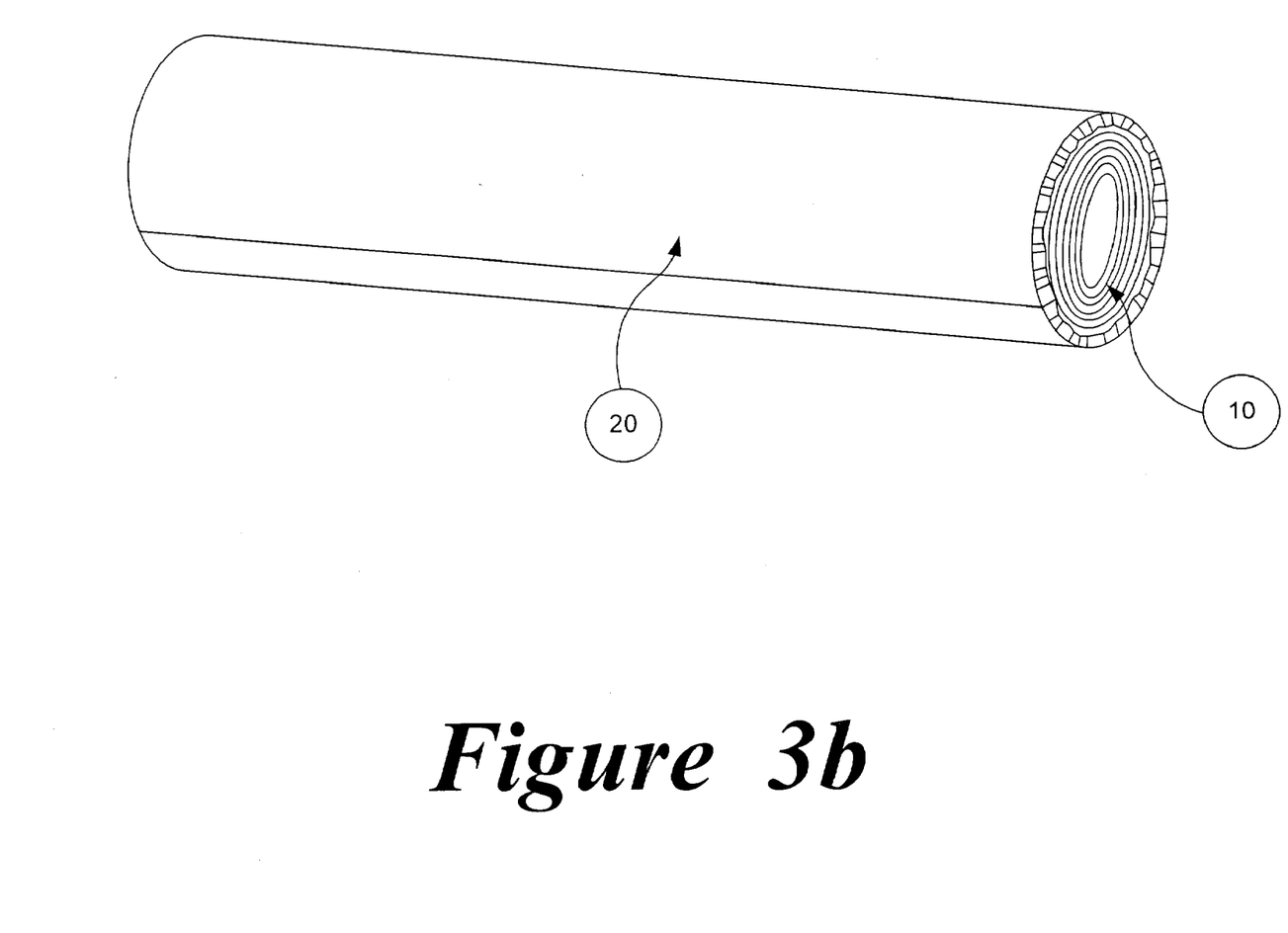
FIG. 3b is a schematic representation of a roll of combustible material, for example, a paper roll covered with a flame retardant first layer of the present invention.

An example of the use of the present invention is illustrated in FIGS. 3a through 3d. FIG. 3a illustrates a paper roll 10 for which it is desired a flame retardant and moisture protective wrap. Paper roll 10 is covered with the FR stable first layer 20 of the present invention in FIG. 3b. As indicated above, the FR stable first layer 20 may be a single flame retardant treated layer (e.g. FR treated Kraft paper) or a composite layer incorporating thermal insulation material as illustrated in FIG. 2b. Although FIG. 3b shows FR stable first layer 20 covering the full width of paper roll 10, this is not always the case. When FR stable first layer 20 is too narrow to fully cover paper roll 10, multiple widths of FR stable first layer 20 may be used. In general, an overlap of 1 to 6 inches of FR stable first layer 20 material is adequate to ensure the flame retardant protection of the layer.

Figure 3C:
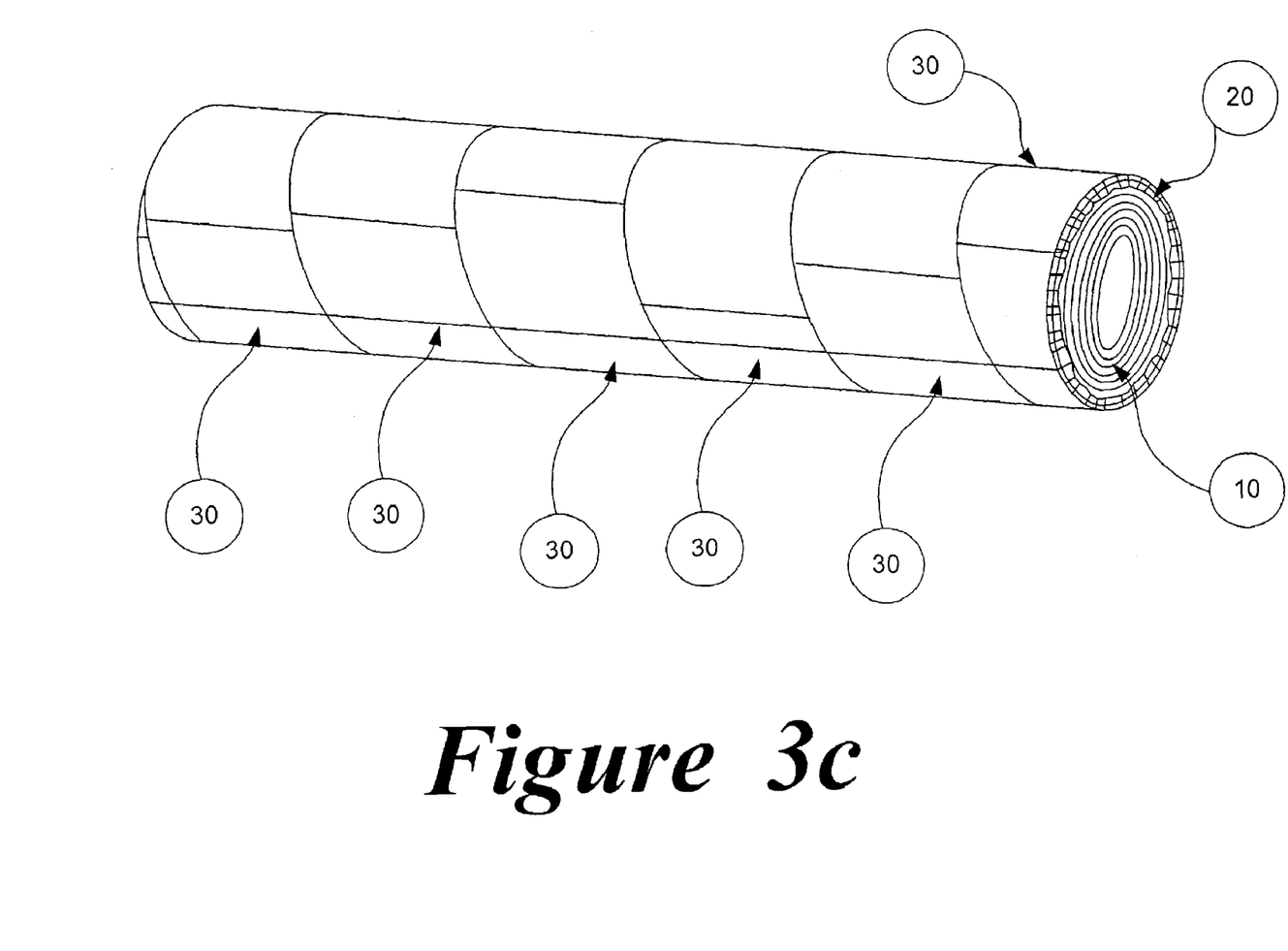
FIG. 3c is a schematic representation of a roll of combustible material, for example, a paper roll covered with a flame retardant first layer of the present invention and secured with stretch wrap and moisture barrier outer layer of the present invention.

FIG. 3c illustrates stretch film 30 covering paper roll 10 that has been first covered with FR stable first layer 20. The width of stretch film 30 may be inadequate to fully cover the width of paper roll 10. In that instance, multiple and overlapped widths of stretch film can be affixed, as illustrated. Another method of covering a width in excess of the film width is to spiral wrap stretch film around paper roll 10. This alternative is preferred when the stretch film is applied by machine. For example, U.S. Pat. No. 5,890,591 to Pienta et. al. discloses a mechanical apparatus suitable for spiral wrapping a paper roll.

The amount of overlap of adjacent stretch film widths should be a minimum of 0.25 to 0.5 inches (6 mm to 12 mm) in order to provide good moisture protection. End overlap of the stretch film is determined during application and needs to be adequate to maintain stretch film 30 in a compact affixed state.

Figure 3D:
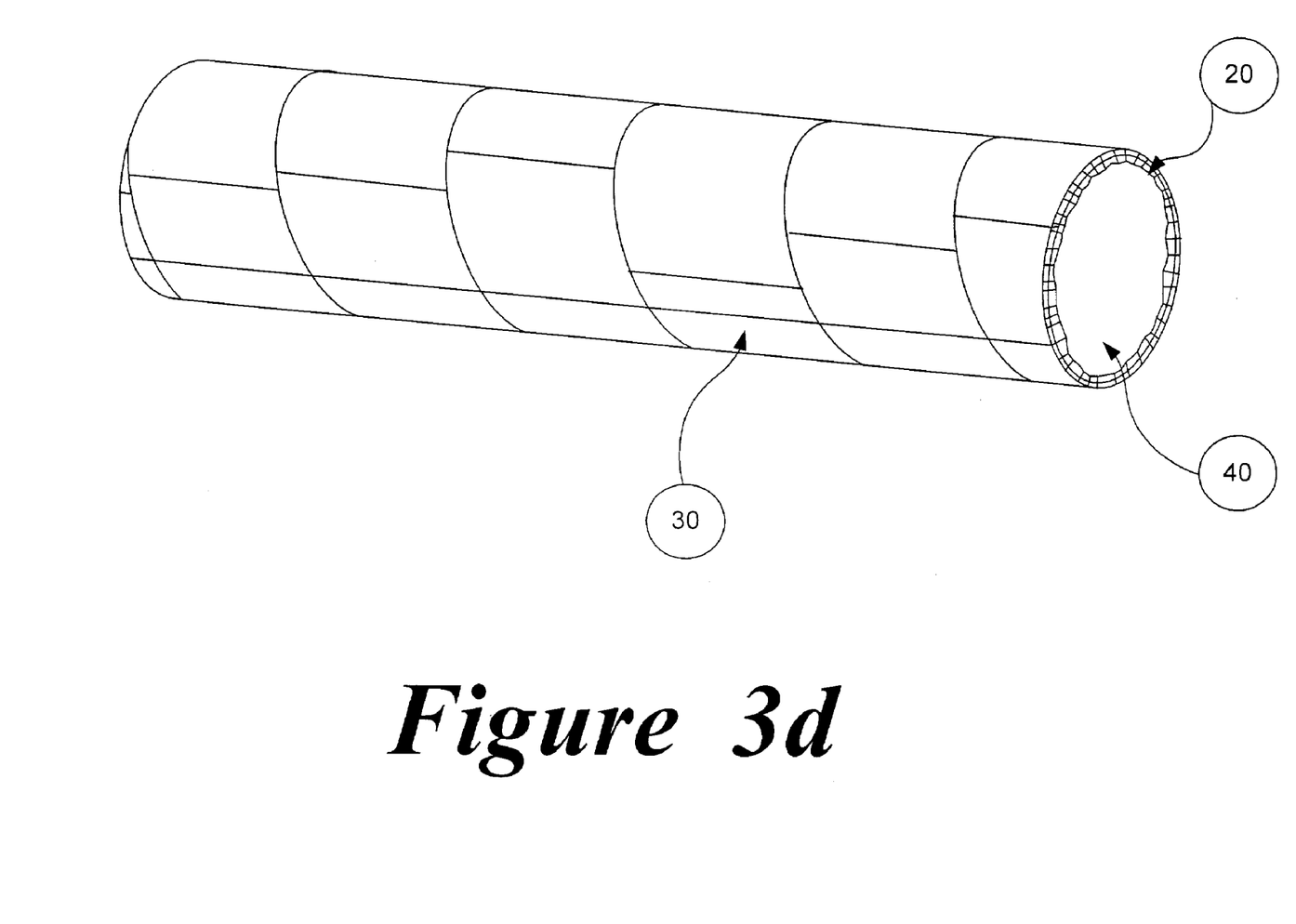
FIG. 3d is a schematic representation of a roll of combustible material, for example, a paper roll covered with a flame retardant first layer of the present invention and secured with stretch wrap and moisture barrier outer layer of the present invention covering each end of the combustible material.

It may be also desired to cover each end of paper roll 10 with the protective wrap of the invention as illustrated in FIG. 3d. Various ways of accomplishing end coverage are known and include, covering the ends prior to affixing the stretch wrap, using molded end protection housings, and the like. As illustrated in FIG. 3d, prior to applying side widths of stretch film 30, the end of paper roll 10 has been first covered with a width of FR stable first layer 20, then a width of stretch film 30. The end layers are held affixed by adjacent wraps of stretch film 30.

As illustrated in FIGS. 1 through 3d, stretch film is used as the outermost layer of the present invention and provides moisture protection. Stretch films suitable for use include many films as known in the art and available commercially. Preferably the stretch film is a polyolefin stretch films. The "stretch" quality of a polyolefin stretch film allows for a relatively simple and inexpensive binding and compacting affixant of the FR stable first layer to the combustible material. Since the FR stable first layer is a stable dimension material, it maintains its flame retardant properties in the event of a fire. Upon initial exposure to a fire, the stretch film will shrink and otherwise pull away from the flame, leaving the underlying FR stable first layer exposed to the flame.

Surprisingly it has been discovered that the suitable polyolefin stretch films include those incorporating flame retardancy as well as those absent flame retardant additives. As is demonstrated below, protective wraps of the present invention pass the large scale NFPA 701 test when incorporating premium stretch film as well as flame retardant stretch film.

Suitable non-flame retardant polyolefin stretch films suitable for use in the present invention include those disclosed in U.S. Pat. Nos. 5,902,684, 5,976,682, 6,361,875, 6,492,010 and 6,495,245. They are also commercially available from such companies as Intertape Polymer Group of Montreal, Canada and Sarasota, Fla.

For added protection, flame retardant additives may be incorporated into the polyolefin stretch film to impart flame retardant properties. Such additives include organohalogen, metal oxides and amine compounds. Perhaps most common are brominated or chlorinated organic compounds along with antimony trioxide and/or phosphorous-based compounds. Included in the brominated compounds are flame retardants such as tris(3-bromo-2,2-bis(bromomethyl)propyl)phosphate, decabromodiphenyl oxide, ethylene bis-(tetrabromophthalimide), and ethylene bis-(dibromo-norbomane-dicarboximide). Flame retardant additives are available commercially from such companies as Albermarle Corporation of Richmond, Va. and Technical Polymer Representatives of Amherst, Ohio. Ethylene bis-(tetrabromophthalimide) is particularly preferred due to its non-blooming characteristic.

Figure 4:
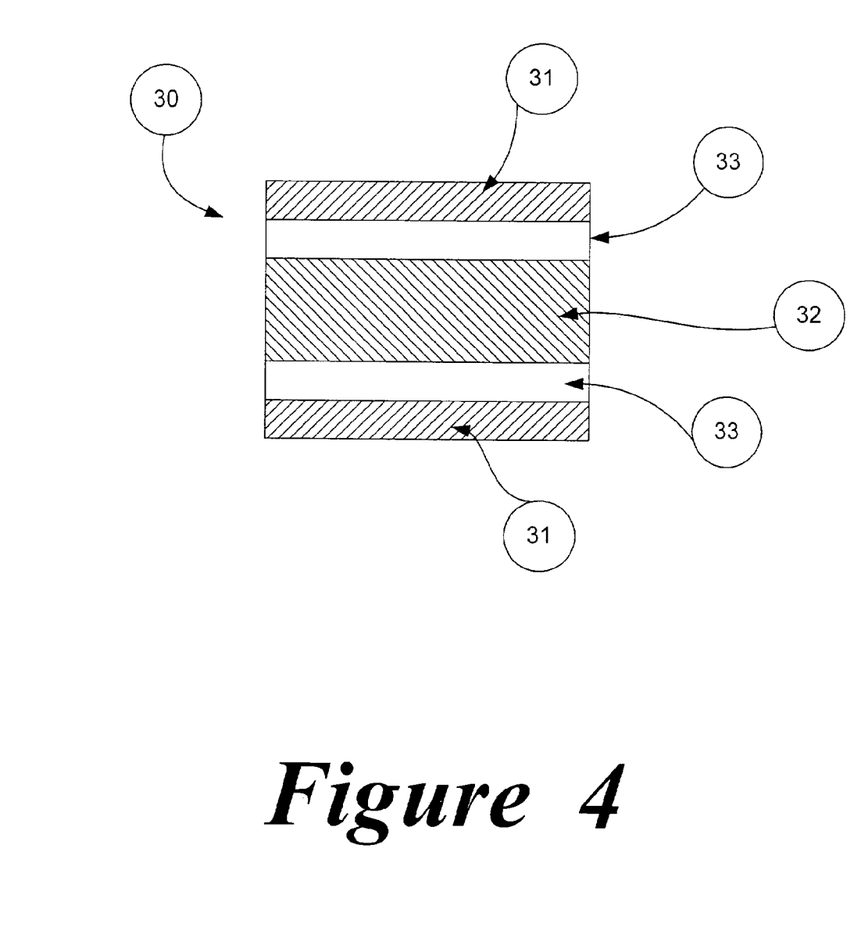
FIG. 4 is a schematic representation of a cross section of a five-layer stretch film suitable for use in the present invention.

FIG. 4 illustrates an example of a multi-layer flame retardant polyolefin stretch film indicated generally as 30. The stretch film comprises two outer polyolefin layers 31, a core flame retardant layer 32 and two intermediate polyolefin layers 33. The purpose of the multiple layers is to allow for concentrated amounts of flame retardant additives in inner layers 32 and 33 without impairing cling properties of outer layers 31.

Core flame retardant layer comprises an effective concentration of flame retardant additives. In general, from 2% to 15% by weight of flame retardant additives are incorporated into core layer 32 and intermediate layers 33 of a flame retardant polyolefin stretch film. In contrast, less than 1% by weight of flame retardant additives are present in outer layers 31.

National Fire Protection Association (NFPA) designates vertical flame testing according to test procedure 701 as either large scale or small scale. In the case of large scale 701 testing, a test sample is prepared with approximate dimensions of 47¼"×5". In contrast, during small scale 701 testing, the sample is prepared to dimensions of 12"×3".

The large scale sample is hung above a Bunsen burner flame source. The burner is ignited and kept lit for duration of approximately 2 minutes. After which, the amount of flame travel, continued burning, etc. is noted. During burner ignition, the flame exposes the test sample to a flame approximately 1 inch in diameter by 7 inches in height. Room ambient air conditions are maintained during the testing period (fire chamber is vented to an overhead smoke containment system).

Various configurations of flame retardant and moisture protective wrap of the present invention were tested according to the NFPA large scale 701 flame tests. Results are shown in Table 1. Five layer polyolefin stretch film, was prepared with and without flame retardant additives. The non-flame retardant stretch film is similar to that available as StretchFlex® from Intertape Polymer Group of Montreal, Canada and Sarasota, Fla. Approximately 10% by weight of flame retardant additive was present in the core and intermediate layers of the flame-retardant treated polyolefin stretch film.

As seen in Table 1, the flame retardant wrap of the present invention provides flame protection with both flame retardant and non-flame retardant stretch film layers. The flame retardant stretch film has the advantage of not providing combustible fuel to a potential fire should it become separated from the remaining FR stable first layer.

Flame retardancy outer layers also directly impact customer acceptance for many flame retardant products. As many customers perceive non-flame retardant polyolefins as being high fuel risks, these customers will prefer the stretch films comprising flame retardant additives.

TABLE 1

NFPA Large Scale 701 Test Results

| Test No. | Description | Results of Large Scale NFPA 701 |
|---|---|---|
| 1 | Compare Test - Combustible Paper Roll, no wrap | Combustible paper roll ignited, continued to burn after flame removed. |
| 2 | Compare Test - Combustible Paper roll wrapped in Kraft paper | Kraft paper and combustible paper roll ignited, continued to burn after flame removed. |
| 3 | Compare Test - Combustible paper roll wrapped in flame retardant stretch wrap | Within first 20 seconds of test the stretch wrap shrunk away from flame leaving combustible paper roll exposed to the flame. Combustible paper roll ignited and continued to burn after flame removed |
| 4 | Inventive Example - Combustible paper roll wrapped in flame retardant Kraft paper then outer layer of flame retardant stretch wrap applied | Within first 20 seconds of test the stretch wrap shrunk away from flame leaving flame retardant Kraft paper exposed to the flame. Neither the Kraft paper, combustible paper roll nor the flame retardant stretch wrap ignited, 0 flame spread across Kraft paper. |

TABLE 1-continued

NFPA Large Scale 701 Test Results

| Test No. | Description | Results of Large Scale NFPA 701 |
|---|---|---|
| 5 | Inventive Example - Combustible paper roll wrapped in flame retardant Kraft paper then outer layer of non-flame retardant stretch wrap applied | Within first 20 seconds of test the stretch wrap shrunk away from flame leaving flame retardant Kraft paper exposed to the flame. Neither the Kraft paper, combustible paper roll nor the flame retardant stretch wrap ignited, 0 flame spread across Kraft paper. |

Particularly preferred is the combination of flame retardant Kraft paper and polyolefin stretch film. During NFPA large scale 701 testing, it was noted that no tearing of the FR treated Kraft paper layer occurs despite the shrinking away of the stretch film. Of earlier concern was that adhesion between the Kraft paper and the stretch film would result in tearing or pulling of the Kraft paper. This was found to be not a problem with the Kraft paper/non-FR stretch film combination or the Kraft paper/FR stretch film combination.

A flame retardant system and method has been demonstrated. It will also be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A multi-layered flame retardant and moisture barrier wrap capable of passing National Fire Protection Association large scale 701 testing comprising:
    a flame retardant stable first layer;
    a moisture barrier second layer of flame retardant polyolefin stretch film;
    wherein the flame retardant polyolefin stretch film compactly affixes the flame retardant stable first layer against a combustible solid material; and
    wherein the flame retardant polyolefin stretch film comprises a five layer polyolefin stretch film wherein the two outer most layers comprise less than 1% by weight flame retardant additives, the intermediate layers comprise 2% to 15% by weight flame retardant additives and the core layer comprises 2% to 15% by weight flame retardant additives.

2. The multi-layered flame retardant and moisture barrier wrap of claim 1 wherein the flame retardant stable first layer is selected from the group of flame retardant materials consisting of flame retardant treated Kraft paper, mineral wool and fiberglass fabrics, asbestos fabrics, certain flame retardant treated natural fiber fabrics, fabrics of poly(m-phenylene)isophthalamide fibers, fabrics of poly(p-phenylene)terephthalamide fibers, and flame retardant treated fabrics of high density polyethylene fabrics.

3. The multi-layered flame retardant and moisture barrier wrap of claim 1 wherein the flame retardant stable first layer is a flame retardant Kraft paper.

4. The multi-layered flame retardant and moisture barrier wrap of claim 3 wherein the flame retardant Kraft paper has a basis weight of 16 to 150 pounds.

5. The multi-layered flame retardant and moisture barrier wrap of claim 4 wherein the flame retardant Kraft paper has a basis weight of 20 to 80 pounds.

6. The multi-layered flame retardant and moisture barrier wrap of claim 1 wherein the flame retardant stable first layer further comprises a thermal insulation material selected from the group of insulation materials consisting of fiber glass, mineral fiber, mineral wool, and refractory ceramic fiber.

7. The multi-layered flame retardant and moisture barrier wrap of claim 1 wherein the flame retardant stable first layer comprises Kraft paper having a basis weight of 16 to 150 pounds and further comprising a thermal insulation material adhered to the Kraft paper wherein the insulation material is selected from the group of insulation materials consisting of fiber glass, mineral fiber, mineral wool, and refractory ceramic fiber.

8. The multi-layered flame retardant and moisture barrier wrap of claim 1 wherein the flame retardant polyolefin stretch film comprises flame retardant additives selected from the group of flame retardant additives consisting of brominated organic compounds, chlorinated organic compounds, antimony trioxide, and phosphorous-based compounds. Included in the brominated compounds are flame retardants such as tris(3-bromo-2,2-bis(bromomethyl)propyl)phosphate, decabromodiphenyl oxide, ethylene bis-(tetrabromophthalimide), and ethylene bis-(dibromo-norbomane-dicarboximide).

9. The multi-layered flame retardant and moisture barrier wrap of claim 8 wherein the brominated organic compounds are selected from the group of brominated compounds consisting of:
    tris(3-bromo-2,2-bis(bromomethyl)propyl)phosphate;
    decabromodiphenyl oxide;
    ethylene bis-(tetrabromophthalimide); and
    ethylene bis-(dibromo-norbomane-dicarboximide).

10. The method of providing flame retardancy and moisture protection to a combustible solid comprising:
    covering the combustible solid with a flame retardant stable first layer;
    covering the flame retardant stable first layer with a flame retardant polyolefin stretch film layer;
    wherein the polyolefin stretch film compactly affixes the flame retardant stable first layer to the combustible solid; and
    wherein the flame retardant polyolefin stretch film comprises a five layer polyolefin stretch film wherein the two outer most layers comprise less than 1% by weight flame retardant additives, the intermediate layers comprise 2% to 15% by weight flame retardant additives and the core layer comprises 2% to 15% by weight flame retardant additives.

11. The method of claim 10 wherein the polyolefin stretch film overlaps a minimum of 0.25 inches on lateral edges.

12. The method of claim 10 wherein the flame retardant stable first layer is a flame retardant treated Kraft paper having a basis weight of from 20 to 80 pounds.

13. The method of providing flame retardancy and moisture protection to a combustible paper roll comprising:
covering the combustible paper roll with a flame retardant stable first layer;
covering the flame retardant stable first layer with a flame retardant polyolefin stretch film layer;
wherein the flame retardant polyolefin stretch film compactly affixes the flame retardant stable first layer to the combustible solid; and
wherein the flame retardant polyolefin stretch film comprises a five layer polyolefin stretch film wherein the two outer most layers comprise less than 1% by weight flame retardant additives, the intermediate layers comprise 2% to 15% by weight flame retardant additives and the core layer comprises 2% to 15% by weight flame retardant additives.

14. The method of claim 13 wherein the flame retardant stable first layer is selected from the group of flame retardant flame retardant materials consisting of flame retardant treated Kraft paper, mineral wool and fiberglass fabrics, asbestos fabrics, certain flame retardant treated natural fiber fabrics, fabrics of poly(m-phenylene)isophthalamide fibers, fabrics of poly(p-phenylene)terephthalamide fibers, and flame retardant treated fabrics of high density polyethylene fabrics.

15. The method of claim 13 wherein the flame retardant stable first layer is a flame retardant treated Kraft paper.

16. The method of claim 13 wherein the flame retardant Kraft paper has a basis weight of 16 to 150 pounds.

17. The method of claim 16 wherein the flame retardant Kraft paper has a basis weight of 20 to 80 pounds.

18. The method of claim 13 wherein the flame retardant stable first layer further comprises a thermal insulation material selected from the group of insulation materials consisting of fiber glass, mineral fiber, mineral wool, and refractory ceramic fiber.

19. The method of claim 13 wherein the flame retardant stable first layer comprises Kraft paper having a basis weight of 16 to 150 pounds and further comprising a thermal insulation material adhered to the Kraft paper wherein the insulation material is selected from the group of insulation materials consisting of fiber glass, mineral fiber, mineral wool, and refractory ceramic fiber.

20. The method of claim 13 wherein the flame retardant polyolefin stretch film comprises flame retardant additives selected from the group of flame retardant additives consisting of brominated organic compounds, chlorinated organic compounds, antimony trioxide, and phosphorous-based compounds. Included in the brominated compounds are flame retardants such as tris(3-bromo-2,2-bis(bromomethyl)propyl)phosphate; decabromodiphenyl oxide; ethylene bis-(tetrabromophthalimide), and ethylene bis-(dibromo-norbomane-dicarboximide).

21. The method of claim 20 wherein the wherein the brominated organic compounds are selected from the group of brominated compounds consisting of:
tris(3-bromo-2,2-bis(bromomethyl)propyl)phosphate;
decabromodiphenyl oxide;
ethylene bis-(tetrabromophthalimide); and
ethylene bis-(dibromo-norbomane-dicarboximide).

* * * * *